No. 777,773. PATENTED DEC. 20, 1904.
P. A. BOWEN.
LOCKING MECHANISM FOR TELESCOPING TUBING.
APPLICATION FILED MAY 31, 1904.
NO MODEL.
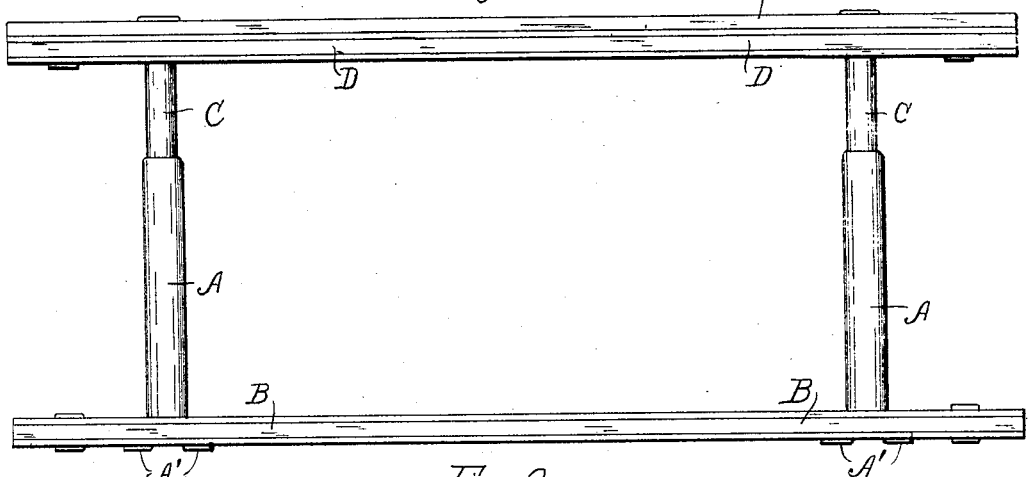
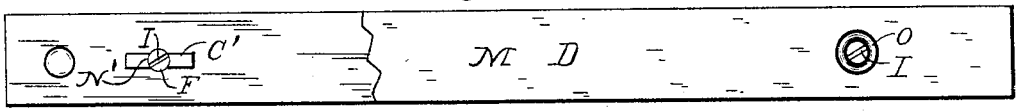
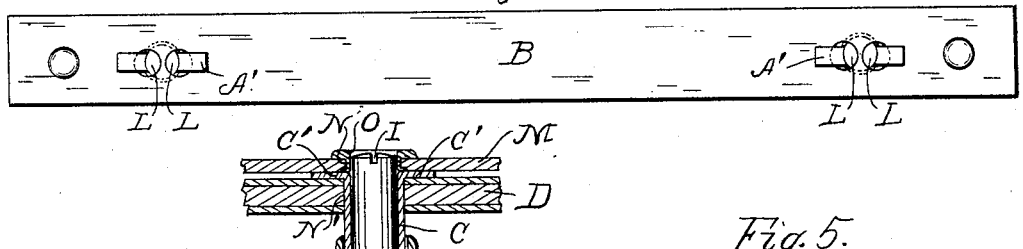
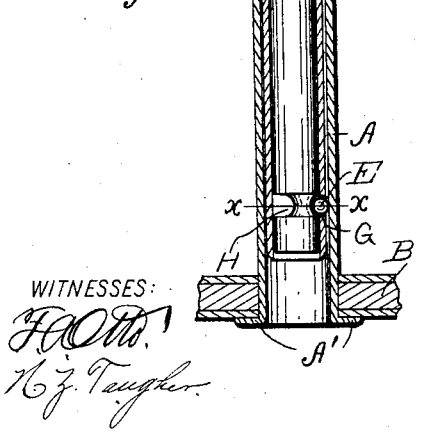
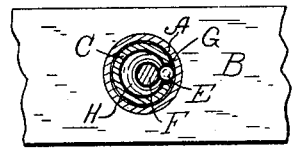
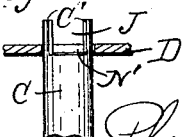
WITNESSES:
INVENTOR
Philip A. Bowen
BY
Erwin & Wheeler
ATTORNEYS.

No. 777,773.

Patented December 20, 1904.

UNITED STATES PATENT OFFICE.

PHILIP A. BOWEN, OF PASSAIC, NEW JERSEY, ASSIGNOR OF ONE-HALF TO ROY C. BOWEN, OF PASSAIC, NEW JERSEY.

LOCKING MECHANISM FOR TELESCOPING TUBING.

SPECIFICATION forming part of Letters Patent No. 777,773, dated December 20, 1904.

Application filed May 31, 1904. Serial No. 210,419.

*To all whom it may concern:*

Be it known that I, PHILIP A. BOWEN, a citizen of the United States, residing at Passaic, county of Passaic, and State of New Jersey, have invented new and useful Improvements in Locking Mechanism for Telescoping Tubing, of which the following is a specification.

My invention relates to improvements in temporary loose-leaf binders for blank-books, periodicals, &c.; and it pertains more especially to the device for locking the telescoping tubes by which the respective fastening-bars located at the sides of the covers of the book are connected together.

The construction of my device is explained by reference to the accompanying drawings, in which—

Figure 1 represents a side view of the binder. Fig. 2 is a top view from the upper side of Fig. 1. Fig. 3 is a bottom view. Fig. 4 is a vertical section of one of the sets of telescoping tubes by which the binding-bars are connected together. Fig. 5 is a transverse section drawn on line x x of Fig. 4. Fig. 6 is a detail representing the preferred form of one end of the telescoping tubes.

Like parts are identified by the same reference-letters throughout the several views.

A represents the exterior telescoping tube, which is permanently secured at one end to one of the binding-bars B by the lugs or flanges A'.

C is the interior telescoping tube, which is rigidly affixed at one end to the opposite binding-bar D by the lugs or flanges C'. The tubes A and C are locked together at any desired point of adjustment by the joint action of the ball E and the central binding-rod F. The ball E is interposed between the inner wall of the tube A and the binding-rod F, within the aperture G, which aperture G is formed in the wall of the interior tube C and serves to hold the ball in place and prevent it from rolling as the rod F is turned. The rod F is provided in its periphery with an annular groove H, formed eccentric to its longitudinal center for the reception of said ball, whereby as the rod F is turned said ball is forced outwardly and caused to impinge firmly against the inner wall of the tube A within the aperture of the tube C, whereby said telescoping tubes and binding-rod are all locked rigidly together. It will of course be understood that said parts can be released by turning said rod F back again until the deeper part of the annular groove H is brought beneath the ball; that when locking said parts together the rod F may be turned in either direction, toward the right or the left. The protruding end of the rod F may be made either rectangular in shape for the reception of a wrench or provided with a recess I, as shown, for the reception of a screw-driver.

Preparatory to attaching the tubes A and C to the respective binding-bars B and D one end of each of said tubes is recessed, as shown at J in Fig. 6, whereby two projecting fastening-lugs A' A' and C' C' are formed in the respective tubes, while the binding-bar B is provided with two small apertures L L, one for each of said fastening-lugs A', and the bar D is provided with a single larger aperture N' for the reception of the end of the tube C, whereby when said lugs are inserted through said apertures and turned down against said bars said parts will be held rigidly together. While I prefer the device described for connecting the telescoping tubes to the bars by the lugs A' and C', it is obvious that the tubes may, if desired, be secured to the bars by annular flanges instead or in any other convenient manner. To give the device a finished appearance, I preferably cover the exterior surface of the binding-bars B and D with a thin strip of leather or other equivalent covering M. The covering M upon the sides of the protruding binding-rods F is provided with apertures N, through which the binding-rods may be reached with the fastening-tool. The apertures N are preferably provided with eyelets O, of ordinary construction, which give the cover a neat and finished appearance. The covering M may be secured to the binding-bars with adhesive material or in any other desirable manner.

Having thus described my invention, what I claim as new, and desire to secure by Letters Patent, is—

1. In a device of the described class, the combination of two telescoping tubes, an interior tube provided with a ball-receiving aperture; a ball located in said aperture; an exterior overlapping tube; a central binding-rod located within the inner tube provided with an annular groove formed eccentric to its longitudinal axis, one end of said binding-rod being provided with means for turning the same on its longitudinal axis within said telescoping tubes, whereby said ball is forced outwardly within the aperture of said interior tube and caused to impinge against the inner wall of said exterior tube and lock said tubes and binding-rod together.

2. In a device of the described class, the combination of two telescoping tubes, the interior of which is provided with a ball-receiving aperture; an exterior overlapping tube; a central binding-rod located within said inner tube provided with an annular groove formed eccentric to the longitudinal center of said rod; a ball interposed between said binding-rod and the interior wall of said exterior tube within said aperture, the protruding or outer end of said binding-rod being provided with a recess for the reception of an operating instrument, whereby the same may turn when desirous to lock said telescoping tubes together, substantially as set forth.

3. In a device of the described class, the combination of an interior tube provided at one end with a ball-receiving aperture and at its opposite outer end with a plurality of fastening-lugs; an exterior overlapping tube provided at its outer end with a plurality of fastening-lugs; a central binding-rod located within said inner tube and provided with an annular groove formed eccentric to the longitudinal axis of said binding-rod; a ball located in said aperture between said binding-rod and the inner wall of said exterior tube, the outer end of said fastening-rod being provided with means for turning the same on its longitudinal axis.

4. In a temporary loose-leaf binder, the combination of an interior and an exterior telescoping tube, said interior tube being provided at its inner end with a ball-receiving aperture and connected at its outer end with a binding-bar, said exterior tube being rigidly affixed at one end to another opposing binding-bar; a central binding-rod located within the inner tube and provided with an annular groove formed eccentric to the longitudinal axis of said binding-rod; a ball located in said aperture between said binding-rod and the inner wall of said exterior telescoping tube and means for turning said binding-rod on its longitudinal axis within said tubes against said ball, whereby said telescoping tubes and binding-rod may be locked at any desired point of adjustment and the transversely-arranged bars of the binder secured together, all substantially as and for the purpose specified.

In testimony whereof I affix my signature in the presence of two witnesses.

PHILIP A. BOWEN.

Witnesses:
RICHARD BINGER,
C. E. MOREHOUSE.